(12) United States Patent
Kokubo

(10) Patent No.: US 7,133,766 B2
(45) Date of Patent: Nov. 7, 2006

(54) ENGINE COMBUSTION STATE DETECTION DEVICE

(75) Inventor: Naoki Kokubo, Nukata-gun (JP)

(73) Assignee: Denso Corporation, Kariya (JP)

( * ) Notice: Subject to any disclaimer, the term of this patent is extended or adjusted under 35 U.S.C. 154(b) by 125 days.

(21) Appl. No.: 11/072,397

(22) Filed: Mar. 7, 2005

(65) Prior Publication Data

US 2005/0193804 A1  Sep. 8, 2005

(30) Foreign Application Priority Data

Mar. 8, 2004  (JP) ............................ 2004-063328

(51) Int. Cl.
*F02P 5/152* (2006.01)
(52) U.S. Cl. .................... 701/114; 73/116; 73/117.3; 123/406.2
(58) Field of Classification Search ............... 701/114, 701/110, 111; 73/116, 117.3, 35.12; 123/406.2, 123/406.13, 406.58
See application file for complete search history.

(56) References Cited

U.S. PATENT DOCUMENTS 5,111,405 A * 5/1992 Maeda et al. ............... 701/110
5,241,480 A * 8/1993 Takaku et al. .............. 701/111
5,875,411 A    2/1999 Volkart et al. .............. 701/110
6,401,527 B1   6/2002 Langer ....................... 73/117.3
6,644,274 B1  11/2003 Hasegawa et al. ...... 123/406.41
6,688,286 B1   2/2004 Kokubo et al. ......... 123/406.33

FOREIGN PATENT DOCUMENTS

| JP | 7-174773 | 7/1995 |
| JP | 2508635 | 4/1996 |
| JP | 2000-240500 | 9/2000 |
| JP | 2001-193548 | 7/2001 |
| JP | 2001-314069 | 11/2001 |
| JP | 2001-341069 | 11/2001 |

* cited by examiner

*Primary Examiner*—Hieu T. Vo
(74) *Attorney, Agent, or Firm*—Nixon & Vanderhye P.C.

(57) ABSTRACT

A rotation angle sensor detects the rotation speed of a crankshaft of an engine. An ECU extracts a first frequency component synchronized with combustion cycles of the engine that is contained in a rotation speed signal obtained by the detection of the rotation angle sensor, and a second frequency component having a higher frequency than the first frequency component. It detects a combustion state by using the rotation variation amount of the first frequency component in a lower rotation range than a specified engine speed, and by using the rotation variation amount of the second frequency component in a higher rotation range.

13 Claims, 9 Drawing Sheets

ENGINE COMBUSTION STATE DETECTION DEVICE

CROSS REFERENCE TO RELATED APPLICATION

This application is based on and incorporates herein by reference Japanese patent application No. 2004-63328 filed on Mar. 8, 2004.

FIELD OF THE INVENTION

The present invention relates to a device for detecting combustion states of an internal combustion engine.

BACKGROUND OF THE INVENTION

It is known that, during the operation of an internal combustion engine, the rotation speed of the internal combustion engine fluctuates according to combustion cycles. Some conventional technologies detect a combustion state such as misfire on the basis of combustion cycle fluctuation of the rotation speed.

For example, according to U.S. Pat. No. 6,401,527, a combustion state is detected by comparing a rotation variation amount in the former half of one combustion cycle and a rotation variation amount in the latter half.

According to JP-2000-240500A, in the normal operation state, angular speed fluctuation difference amounts of a crankshaft within a predetermined stroke are detected plural times to obtain a probability distribution of the angular speed fluctuation difference amounts so that misfire is detected by setting a reference value for determining an abnormal combustion area on the basis of the probability distribution. In such a case, since a difference occurs in the variation amount of rotation speed of each combustion cycle between during the normal combustion and during the abnormal combustion such as misfire, a combustion state can be detected.

However, according to the conventional detection method, as an engine speed increases, the detection accuracy of combustion states decreases. Specifically, it is confirmed that the rotation speed fluctuation of each combustion cycle reduces in a high rotation range, and the reduced rotation speed fluctuation makes the differentiation between the normal combustion state and the abnormal combustion state difficult, causing reduction in the detection accuracy of combustion states.

SUMMARY OF THE INVENTION

A main object of the present invention is to provide a combustion state detection device of an internal combustion engine that can accurately detect combustion states in a range containing a high rotation range of the internal combustion engine.

According to the present invention, the rotation speed of a crankshaft of an internal combustion engine is detected, and a second frequency component is extracted. The second frequency component has a higher frequency than a first frequency component synchronized with combustion cycles of the internal combustion engine. The first frequency component is contained in a rotation speed signal obtained by the detection. Combustion states of the internal combustion engine are detected on the basis of the extracted second frequency component.

The rotation speed of the crankshaft fluctuates or varies according to combustion cycles of the internal combustion engine, and the rotation speed signal contains a frequency component (first frequency component) synchronized with combustion cycles. Moreover, the rotation speed signal contains the vibration (second frequency component) of the high-frequency component generated due to the torsion of the crankshaft or the like. It is confirmed that the second frequency component being the high-frequency component increases in rotation fluctuation particularly in a high rotation range of the internal combustion engine. Therefore, by using the second frequency component, engine combustion states can be accurately detected even in the high rotation range.

Since the second frequency component increases in rotation fluctuation in a high rotation range of the internal combustion engine, it is desirable to detect combustion states of the internal combustion engine on the basis of the second frequency component for a higher rotation range than a specified engine speed.

The first frequency component synchronized with combustion cycles is large in rotation fluctuation in a low rotation range of the internal combustion engine but small in rotation fluctuation in a high rotation range. The second frequency component becomes large in rotation fluctuation in a high rotation range of the internal combustion engine. Accordingly, it is preferable to detect combustion states of the internal combustion engine on the basis of the first frequency component in a lower rotation range than a specified engine speed, and combustion states of the internal combustion engine on the basis of the second frequency component in a higher rotation range.

In a multi-cylinder internal combustion engine, the second frequency component is large in variations due to an attenuation characteristic among cylinders. The attenuation characteristic occurs depending on the rotation speed detection position of a crankshaft, and the arrangement of the cylinders. Cylinders more distant from the rotation speed detection position of the crankshaft experience more attenuation of rotation fluctuation of the high-frequency component. Accordingly, the rotation variation amount of the second frequency component is corrected on the basis of the attenuation characteristic of the second frequency component among the cylinders. By this operation, variations of the second frequency component among the cylinders can be eliminated.

By comparing a rotation variation amount of the second frequency component calculated for each cylinder and a rotation variation amount of the first frequency component, an attenuation learning value as the attenuation characteristic is calculated for each cylinder, and a rotation variation amount of the second frequency component is corrected by the attenuation learning value. In this case, if the rotation variation amount of the first frequency component is used as a reference value because it is small in variations among the cylinders, variations of rotation variation amounts of the second frequency component among the cylinders can be accurately learned.

Furthermore, when the internal combustion engine is in a specified low rotation state, an attenuation learning value may be calculated for each cylinder by the first frequency component and the second frequency component. Since variations of the first frequency component are particularly small in a low rotation state of the internal combustion engine, attenuation learning values can be accurately learned.

A rotation variation amount of the second frequency component may be corrected for each cylinder on the basis of cylinder-specific attenuation characteristic data of the second frequency component stored in advance. In this case, although attenuation characteristic data (e.g., map or the like) corresponding to the number of cylinders must be prepared, variations of the high-frequency component among the cylinders can be eliminated, and the detection accuracy of engine combustion states can be increased.

An extraction frequency band for extracting the second frequency component from the rotation speed signal is set variable according to an engine speed. Specifically, the second frequency component is based on the torsional resonance frequency of the crankshaft, and its frequency does not depend on the engine speed, while the frequency of the first frequency component changes depending on the engine speed. In this case, by setting an extraction frequency band of the second frequency component according to the engine speed, the first frequency component and the second frequency component can be clearly separated even when the difference between them becomes small. It is preferable to set an extraction frequency band of the second frequency component to a higher frequency as the engine speed becomes higher.

An extraction frequency band for extracting the first frequency component from the rotation speed signal is set variable according to an engine speed. In this case, the first frequency component can be correctly extracted according to an engine speed. Specifically, it is preferable to set an extraction frequency band of the first frequency component to a higher frequency as the engine speed becomes higher.

There exists a correlation between the rotation variation amount of the second frequency component and the combustion torque of the internal combustion engine. It can be presumed that when the rotation variation amount is larger, combustion torque is larger. Therefore, combustion torque developed during the combustion of the internal combustion engine can be presumed on the basis of the rotation variation amount of the second frequency component.

There exists a correlation between the position in which the rotation fluctuation of the second frequency component is the maximum, and a cylinder pressure peak position of the internal combustion engine. Therefore, a cylinder pressure peak position of the internal combustion engine can be presumed on the basis of the second frequency component. If a cylinder pressure peak position of the internal combustion engine can be presumed, the estimation result can be used for ignition timing control and the like.

When a knock occurs, since vibration by the knock is transferred to the crankshaft through a piston or the like, a knock signal component is contained in a detection signal of rotation speed. Therefore, knock vibration can be detected in the rotation speed detection. The knock vibration can be detected as the second frequency component. Therefore, knock occurrence can be determined on the basis of the second frequency component.

Rotation fluctuations of the second frequency component are sampled plural times, and combustion stability or combustion roughness of the internal combustion engine can be determined on the basis of statistical processing for the sampled rotation fluctuations. In this case, combustion stability is determined according to variations of the rotation fluctuations of the second frequency component. As rotation fluctuation parameters, peak value, variation amount (amplitude amount), integral value of the variation amount and the like may be used.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
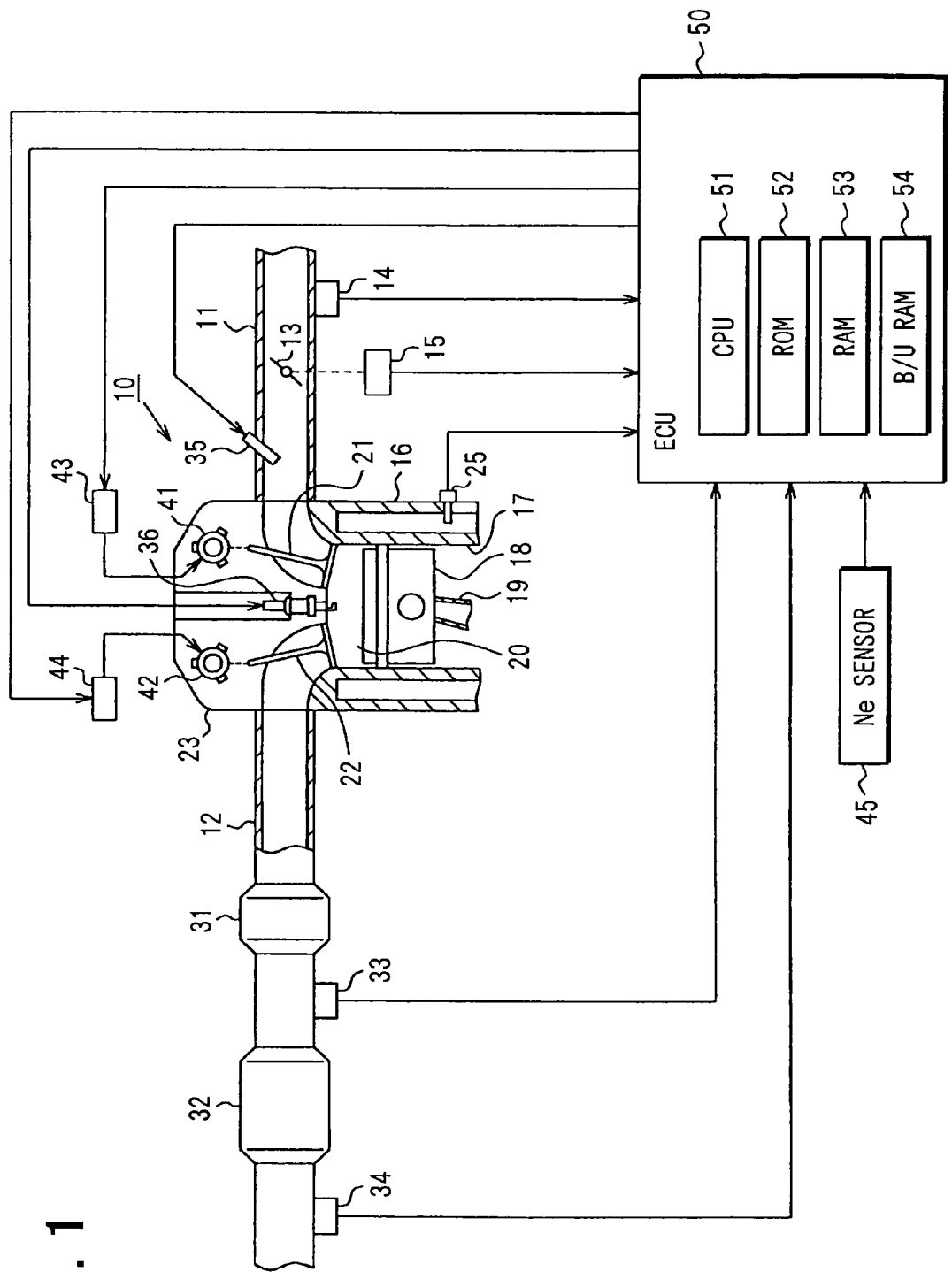
FIG. 1 shows a schematic diagram of an engine control system having an engine combustion state detection device according to an embodiment of the present invention.

In FIG. 1 showing an embodiment, an engine control system is for a four-cycle multi-cylinder internal combustion engine 10 of spark-ignition type. In the control system, an electronic control unit (ECU) 50 controls fuel injection quantities and ignition timing.

The engine 10 has an intake pipe 11 and an exhaust pipe 12, which are connected to intake ports and exhaust ports, respectively. The intake pipe 11 is provided with a throttle valve 13 linked to an accelerator pedal, and disposed with an air flow meter 14 for detecting the quantity of intake air. The degree of opening of the throttle valve 13 is detected by a throttle sensor 15. The full closing of the throttle can also be detected by the sensor 15.

A cylinder 17 is formed in a cylinder block 16, and a piston 18 is disposed within the cylinder 17. The piston 18 is coupled to a crankshaft (not shown) through a connecting rod 19. A combustion chamber 20 partitioned by the cylinder block 16 and a cylinder head 23 is provided above the piston 18. The combustion chamber 20 communicates with the intake pipe 11 and the exhaust pipe 12 through an inlet valve 21 and an exhaust valve 22. The cylinder block 16 is disposed with a water temperature sensor 25 for detecting the temperature of engine coolant water.

The exhaust pipe 12 is disposed with two catalytic converters 31 and 32, which comprise a three-way catalyst for purifying three elements such as HC, CO, and NOx in exhaust gas. In comparison with the catalyst converter 32 on the downstream side, the catalyst converter 31 on the upstream side is smaller in capacity and is quicker in warming-up immediately after the engine is started up, serving as a start catalyst. The catalyst converter 31 on the upstream side is provided about 300 mm away from the end of the engine exhaust port.

An A/F (air/fuel ratio) sensor 33 comprising a limiting current air-fuel ratio sensor is provided on the upstream side of the catalytic converter 32. The A/F sensor 33 outputs a wide-range and linear air-fuel ratio signal in proportion to oxygen concentrations of exhaust gas (or concentrations of carbon monoxide in unburned gas). On the downstream side of the catalytic converter 32, an $O_2$ sensor 34 is provided which outputs different voltage signals between the rich side and the lean side across the border of the stoichiometric air-fuel ratio.

A pressurized fuel is supplied to an injector 35 of electromagnetic drive type from a fuel supply system. The injector 35 injects fuel to the engine intake port when energized. A multipoint injection (MP1) system is adopted which has one injector 35 for each branch pipe of an intake manifold. A spark plug 36 disposed on the cylinder head 23 is ignited by an ignition voltage supplied from an igniter.

In this case, fresh air supplied from the upstream side of the intake pipe 11 and the fuel injected by the injector 35 are mixed in the engine intake port. The mixed air flows into the combustion chamber 20 according to an opening operation of the intake valve 21. The fuel flowing into the combustion room 20 is ignited by an ignition spark by the ignition plug 36 and supplied for combustion.

An intake camshaft 41 for opening and closing the intake valve 21 in fixed timing and an exhaust camshaft 42 for opening and closing the exhaust valve 22 in fixed timing are drivingly-connected to the crankshaft through a timing belt. The intake camshaft 41 is provided with an intake variable valve timing mechanism 43 of hydrodynamic drive type. The exhaust camshaft 42 is provided with an exhaust variable valve timing mechanism 44 of hydrodynamic drive type.

The intake and exhaust variable valve timing mechanisms 43 and 44 are respectively provided as variable valve timing mechanisms of phase adjustment type for adjusting a relative rotation phase between the intake and exhaust camshafts 41 and 42, and the crankshaft. Their operation is controlled according to hydraulic control by a solenoid valve not shown in the drawing. Specifically, according to the control amounts of the intake and exhaust variable valve timing mechanisms 43 and 44, the intake and exhaust camshafts 41 and 42 rotate to the retard-angle side or the advance-angle side with respect to the crankshaft. According to the operation, the opening/closing timing of the intake valve 21 and the exhaust valve 22 shifts to the retard-angle side or the advance-angle side.

A rotation angle sensor 45 is provided for detecting a rotation position of the crankshaft. As the rotation angle sensor 45, a resolver is used to transform a rotation angle position into an electrical quantity. A signal waveform shown in FIG. 2 is obtained by transforming the output of the resolver into a digital signal by an RD converter or the like.

Figure 2:
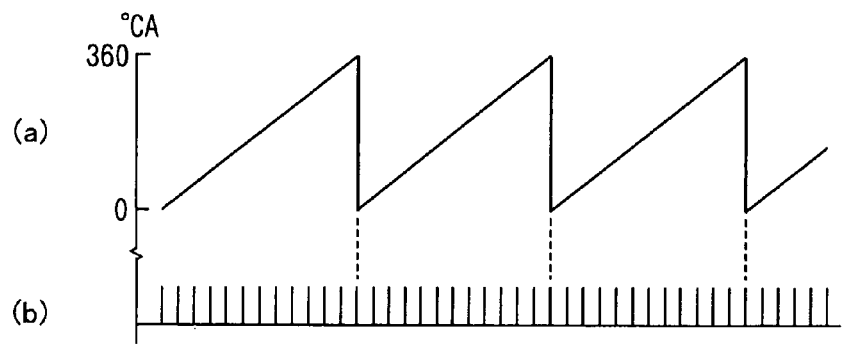
FIG. 2 shows waveforms of the output of a rotation angle sensor.

FIG. 2 shows an output waveform (a) of the rotation angle sensor 45 that uses the resolver, and an output waveform (b) of the rotation angle sensor of the electromagnetic pickup type. The rotation angle sensor 45 using the resolver outputs a linear signal corresponding to a rotation position of the crankshaft, and resets sensor output for each one rotation (360°) of the crankshaft. In contrast, the rotation angle sensor of the electromagnetic pickup type outputs a pulse signal for each fixed crankshaft rotation angle (e.g., every 30° CA).

The ECU 50 has a microcomputer comprising CPU 51, ROM 52, RAM 53, backup RAM 54 and the like. The ECU 50 inputs detection signals of the various sensors, and detects from the detection signals engine operating states such as intake air amounts, throttle opening, engine water temperature, air-fuel ratios in the upstream side and downstream side of the catalysts and engine speed.

The ECU 50, on the basis of the detected different engine operating states detected, controls fuel injection by the injector 35, ignition timing by the spark plug 36, and opening/closing timing of the intake and exhaust valves 21 and 22 by the variable valve timing mechanisms 43 and 44.

Figure 3A:
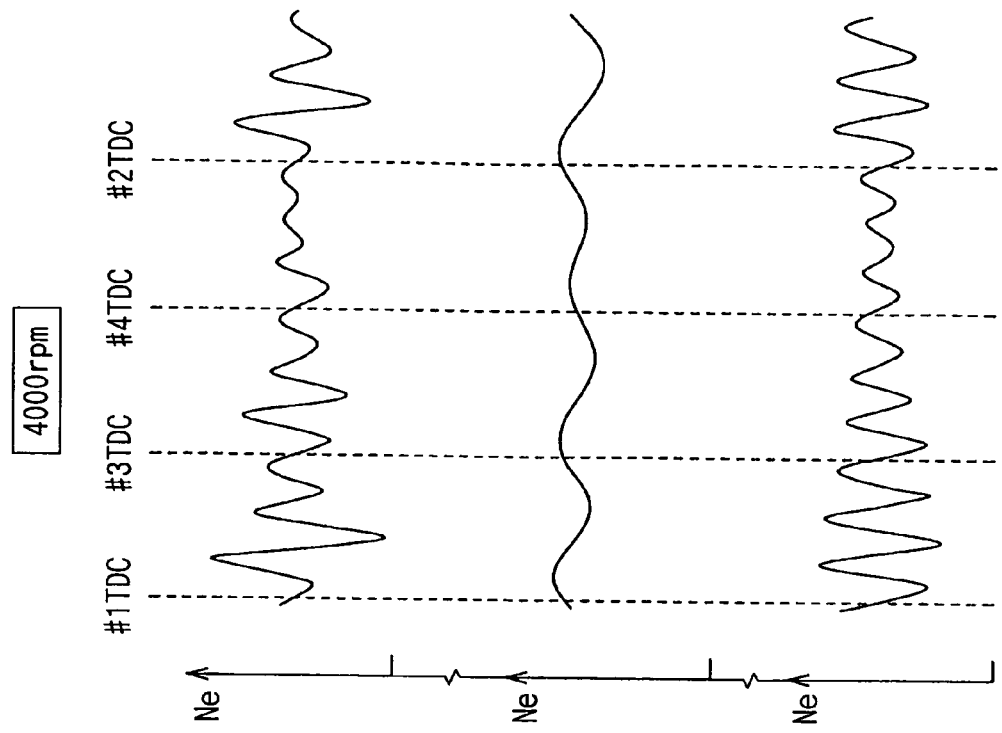
FIGS. 3A and 3B show the relation between crankshaft angles and rotation speeds of a rotation speed signal.
Figure 3B:
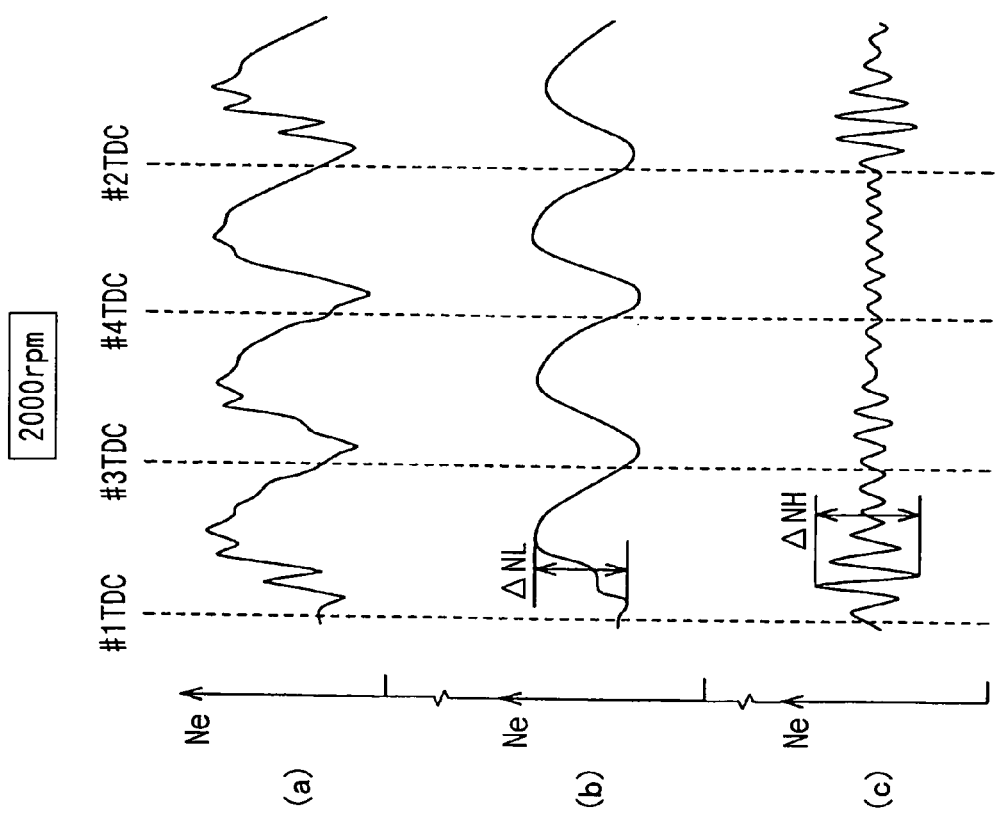

FIGS. 3A and 3B show the relation between crankshaft angles and rotation speeds Ne of a rotation speed signal in a four-cylinder engine. FIG. 3A shows a rotation speed signal in the case of low rotation speed (e.g., 2000 rpm), and the right side shows a rotation speed signal in the case of high rotation speed (e.g., 4000 rpm).

In FIGS. 3A and 3B, (a) shows a waveform of the rotation speed signal, (b) shows a waveform of a low-frequency component contained in the rotation speed signal, and (c) shows a waveform of a high-frequency component contained in the rotation speed signal. The combustion order of the cylinders is the first (#1) cylinder, the third (#3) cylinder, the fourth (#4) cylinder, and the second (#2) cylinder. The compression top dead center (TDC) of each cylinder is represented as #1TDC, #2TDC, #3TDC and #4TDC.

In the case of low rotation shown in FIG. 3A, the rotation speed signal changes according to combustion cycles. The instantaneous speed Ne increases in a combustion expansion stroke after compression TDC of each cylinder, then decreases. Rotation speed fluctuation occurs as a result of the repetition of the operation. Since combustion torque is actually generated after the compression TDC, rotation speed increases after each TDC.

The rotation speed signal contains a low-frequency component that depends on combustion cycle fluctuation, and a high-frequency component having a higher frequency than the low-frequency component. The low-frequency component changes, as shown by (b), synchronously with combustion cycles as described previously. On the other hand, the high-frequency component of the rotation speed signal changes at a fixed frequency independent of combustion cycles, as shown by (c).

The high-frequency component changes according to the torsional resonance frequency of the crankshaft. In this case, the rotation variation amount of the low-frequency component is represented as $\Delta NL$, and the rotation variation amount of the high-frequency component is represented as $\Delta NH$.

The signal waveform of the rotation speed signal during high rotation is different from that during low rotation. That is, the rotation speed signal contains a low-frequency component that depends on combustion cycle fluctuation, and a high-frequency component having a higher frequency than the low-frequency component. The low-frequency component changes, as shown by (b), according to combustion cycles as described previously, with smaller rotation variation amount $\Delta NL$ than that during low rotation. The high-frequency component shown by (c) has a larger rotation variation amount $\Delta NH$ than that during low rotation.

As described above, the rotation variation amount $\Delta NL$ of a low-frequency component is relatively large during low rotation and relatively small during high rotation. The rotation variation amount $\Delta NH$ of a high-frequency component is relatively small during low rotation and relatively large during high rotation. From this fact, it is advantageous to detect engine combustion states on the basis of rotation fluctuation of a low-frequency component during low rotation and on the basis of rotation fluctuation of a high-frequency component during high rotation.

The rotation fluctuation of a high-frequency component varies greatly among the cylinders, possibly bringing about some influence on the detection accuracy of engine combustion states. The variations among the cylinders depend on the arrangement of the mounting positions (sensor detection positions) of the rotation angle sensor 45 and the cylinders. The high-frequency component is larger for the cylinders nearer to the rotation angle sensor 45 and are smaller for the cylinders more distant from the rotation angle sensor 45.

For example, in the case of a serial four-cylinder engine having first to fourth cylinders in which the rotation angle sensor 45 is mounted outside a first connecting rod coupling part of the crankshaft, the rotation variation amount of the high-frequency component decreases in the order of the first cylinder, the second cylinder, the third cylinder and the fourth cylinder, attenuating toward the fourth cylinder. Accordingly, in this embodiment, variations of the high-frequency component among the cylinders are learned, and the rotation variation amount $\Delta NH$ of the high-frequency component is corrected using the learning values.

Figure 4:
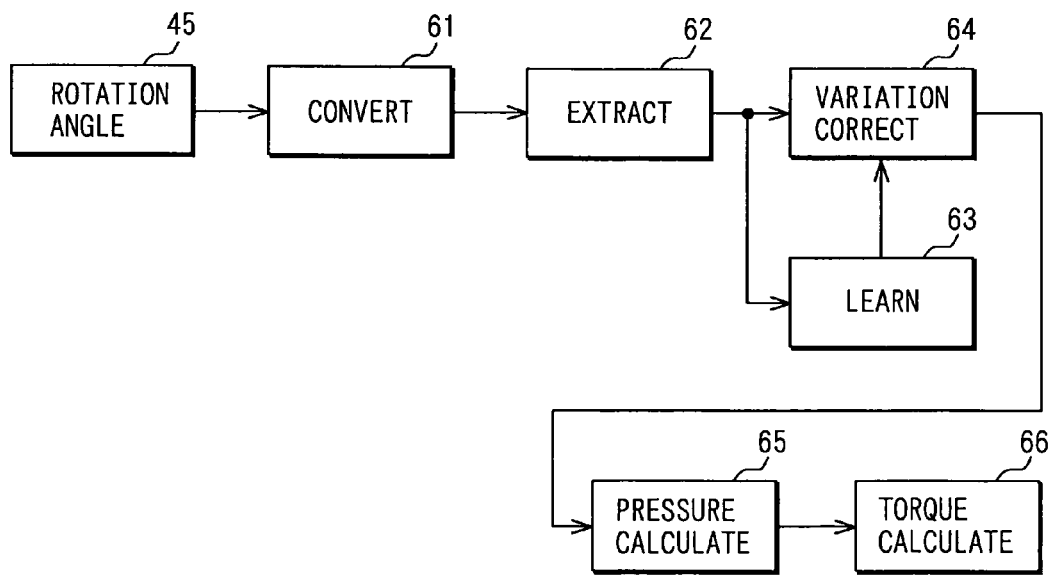
FIG. 4 shows a functional block diagram of the procedure for calculating combustion torque.

The combustion torque is estimated by the ECU 50 as shown in FIG. 4 by the use of the rotation angle sensor 45.

In FIG. 4, a detection signal of the rotation sensor (resolver) 45 is outputted to a rotation conversion part 61 after being subjected to signal processing by an RD converter or the like. In the rotation conversion part 61, the detection signal of the rotation sensor 45 is converted into a rotation speed signal.

After that, a low-frequency/high-frequency component extracting part 62 extracts a low-frequency component synchronized with combustion cycles and a high-frequency component having a higher frequency than the low-frequency component from the rotation speed signal. The low-frequency component is extracted by passing the rotation speed signal through a low pass filter (LPF). The high-frequency component is extracted by passing the rotation speed signal through a high pass filter (HPF).

Figure 5A:
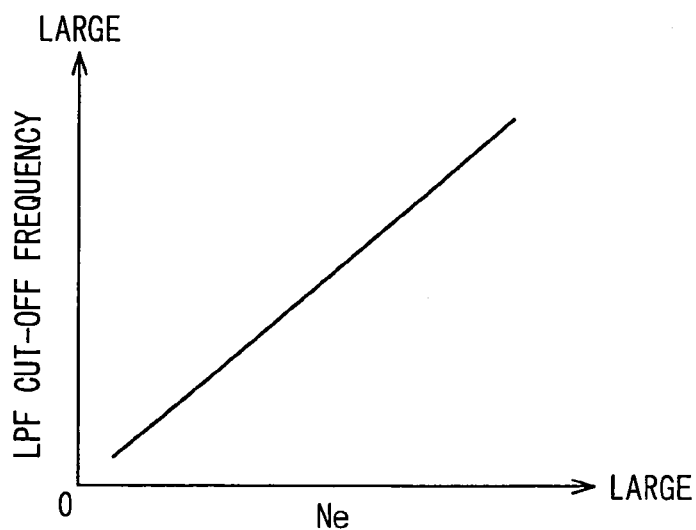
FIGS. 5A and 5B are graphs showing the relations between rotation speeds and LPF and HPF cutoff frequencies.
Figure 5B:
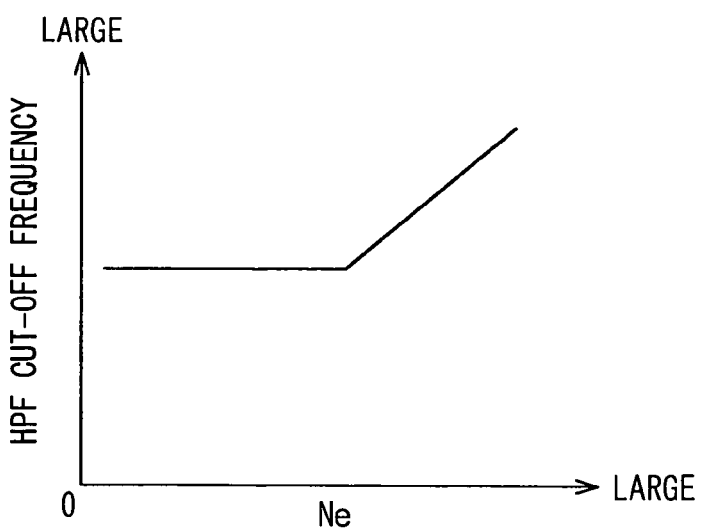

In this case, since the low-frequency component changes according to engine speed Ne, the cutoff frequency of the LPF is set variable according to the engine speed Ne as shown in FIG. 5A. Since the difference between the low-frequency component and the high-frequency component become small in an engine high rotation range, in a range of a predetermined engine speed or higher, the cutoff frequency of the HPF is set variable according to engine speed Ne as shown in FIG. 5B.

An attenuation characteristic learning part 63 learns variations (attenuation characteristics) of the high-frequency component among the cylinders. In this case, attenuation characteristics of the high-frequency component among the cylinders are learned based on a low-frequency component, which are small in variations among the cylinders. Specifically, for each cylinder, rotation variation amount of low frequency component $\Delta NL$, and rotation variation amount of high-frequency component $\Delta NH$ are compared, and attenuation learning values are calculated. In this case, since variations of the low-frequency component among the cylinders are small during engine low rotation, attenuation learning values are calculated for each cylinder during such low rotation.

The rotation variation amount correction part 64 corrects the rotation variation amount $\Delta NH$ of the high-frequency component by using the attenuation learning values obtained as a result of the learning by the attenuation characteristic learning part 63.

A cylinder pressure calculating part 65 calculates a cylinder pressure peak value on the basis of the rotation variation amount $\Delta NL$ of the low-frequency component of the rotation speed signal, or the rotation variation amount $\Delta NH$ of the high-frequency component. In this case, rotation variation amounts of the rotation speed signal, and cylinder pressure peak values are in a relation shown in FIG. 6. By having this relation as a data map or the like, a cylinder pressure peak value is calculated based on a rotation variation amount at that moment.

Figure 6:
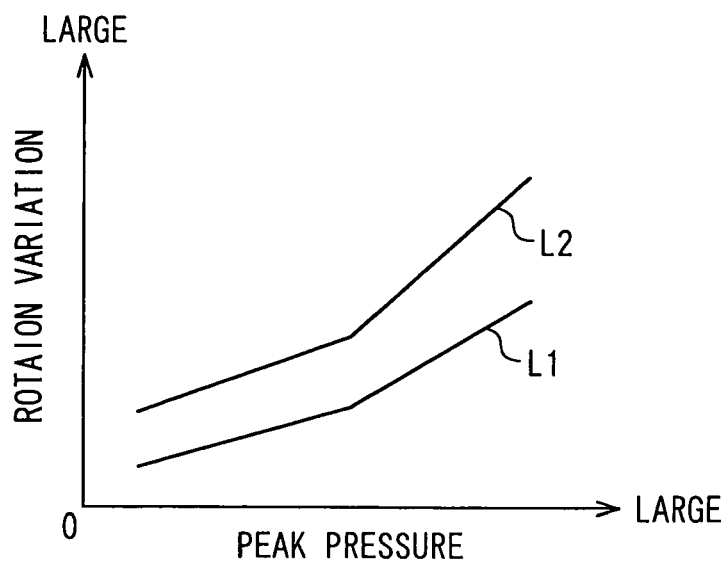
FIG. 6 shows the relation between rotation variation amounts of a rotation speed signal and cylinder pressure peak values.

In FIG. 6, cylinder pressure characteristic L1 for low rotation and cylinder pressure characteristic L2 for high rotation are set. More specifically, L1 is cylinder pressure characteristic at a low speed (e.g., Ne=2000 rpm), and L2 is cylinder pressure characteristic at a high speed (e.g., Ne=4000 rpm). It is determined from FIG. 6 that the larger the rotation variation amount, the larger the cylinder pressure peak value.

Figure 7:
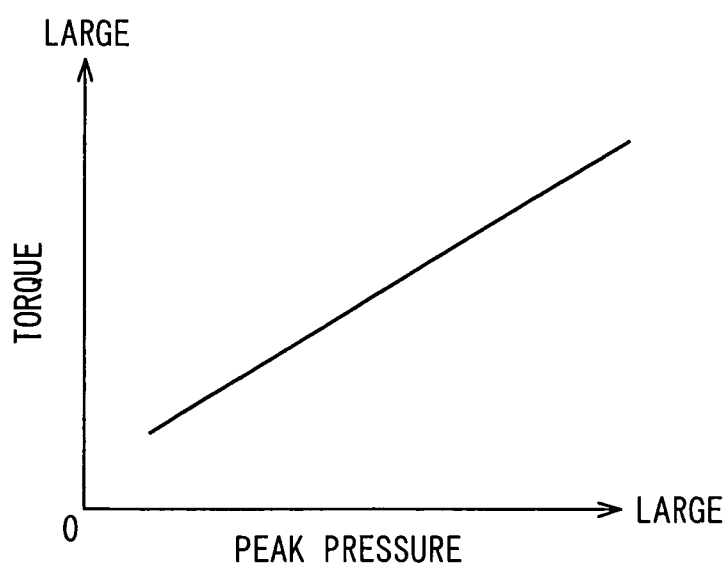
FIG. 7 shows the relation between cylinder pressure peak values and combustion torques.

A combustion torque calculating part 66 calculates combustion torque of the engine 10 on the basis of the cylinder pressure peak value calculated by the cylinder pressure calculating part 65. In this case, cylinder pressure peak values and combustion torques are in a relation shown in FIG. 7. By having this relation as a data map or the like, a combustion torque is calculated based on a cylinder pressure peak value at that moment. It is determined from FIG. 7 that the larger the cylinder pressure peak value, the larger the combustion torque.

Figure 8:
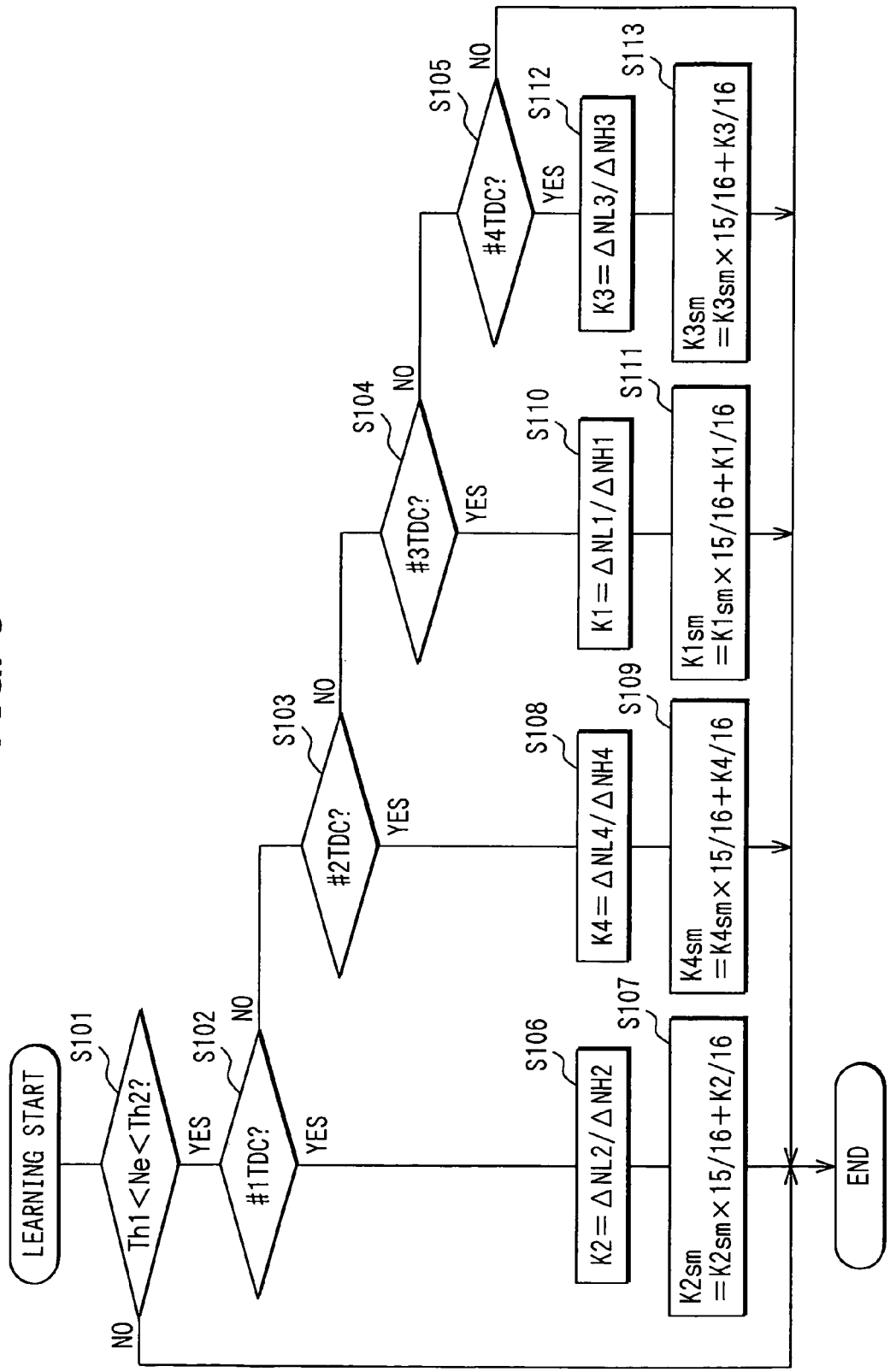
FIG. 8 is shows a flowchart of attenuation characteristic learning processing.
Figure 9:
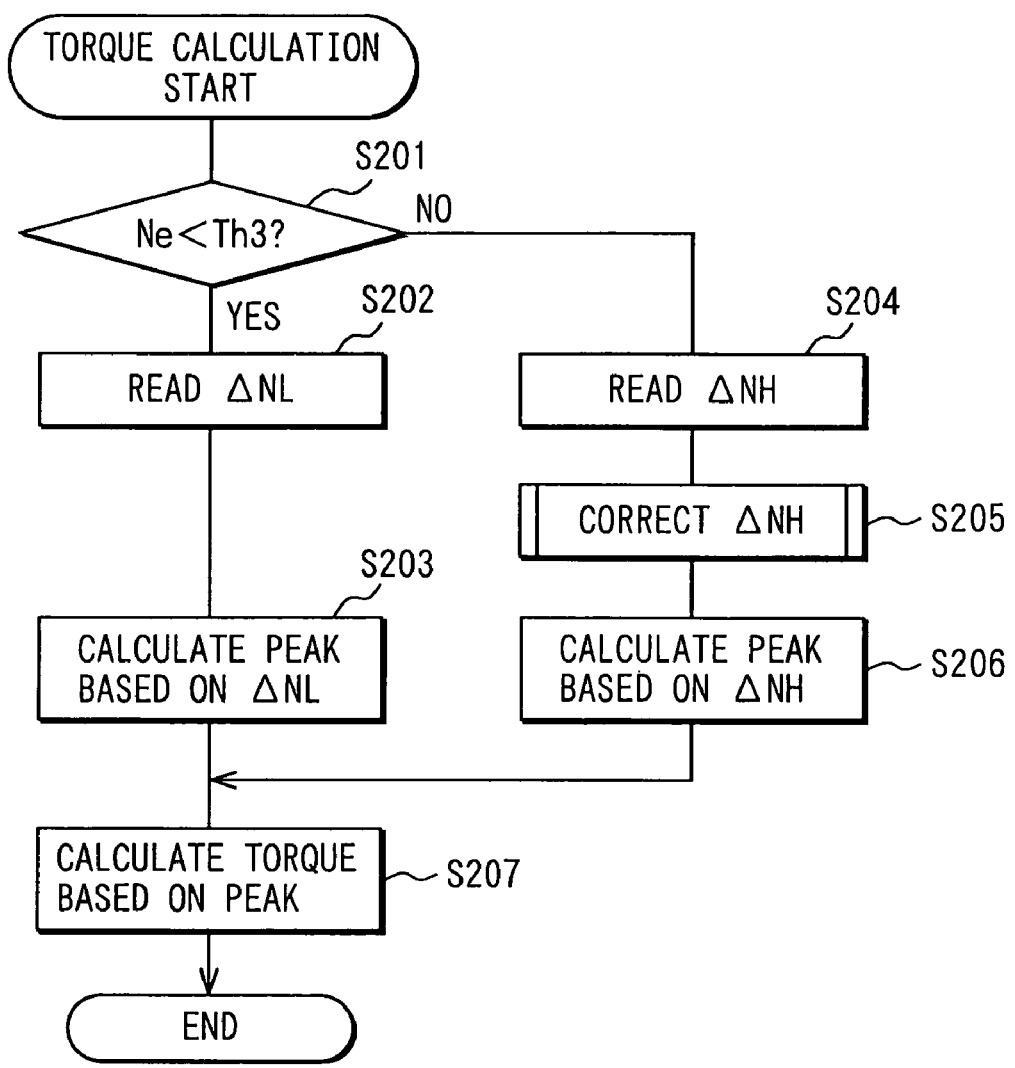
FIG. 9 shows a flowchart of combustion torque calculating processing.
Figure 10:
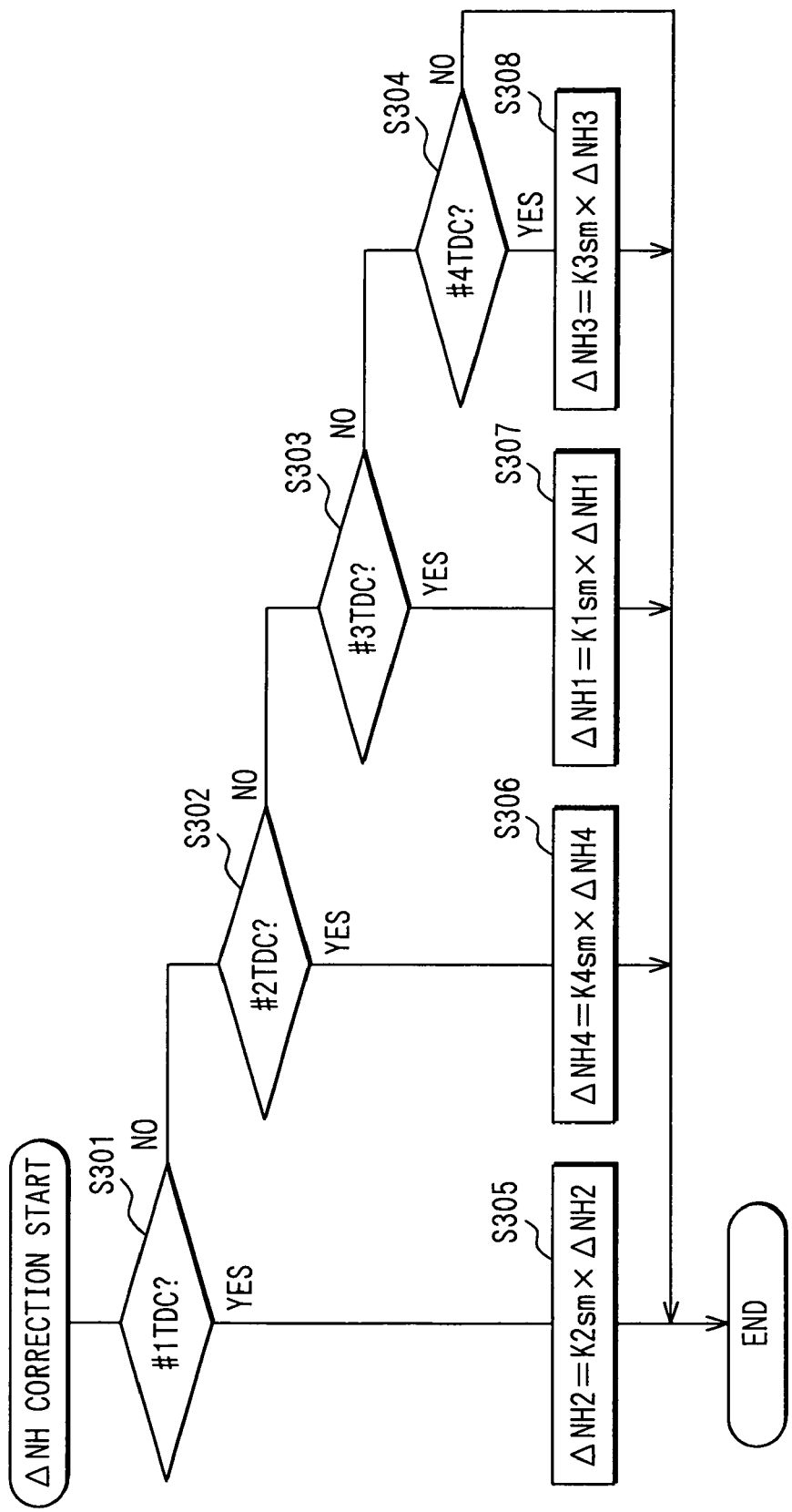
FIG. 10 shows a flowchart of correction processing for rotation variation amounts.

Next, attenuation characteristic learning processing, combustion torque calculating processing and correction processing for rotation variation amounts will be described with reference to FIGS. 8 to 10. The processing of FIGS. 8 and 9 are performed in synchronization with compression TDC of each cylinder. The processing of FIG. 10 is performed as a subroutine of the combustion torque calculation processing of FIG. 9.

In the attenuation characteristic learning processing shown in FIG. 8, step S101 determines whether engine speed Ne is within a predetermined range of speed (Th1 to Th2). Th1 and Th2 are threshold values for determining whether the engine speed Ne is within the predetermined attenuation characteristic learning range; for example, Th1=1000 rpm, and Th2=2000 rpm. If the engine speed Ne is within the predetermined range of speed (Th1 to Th2), control proceeds to the following step S102.

Steps S102 to S105 determine a cylinder currently in compression TDC. In this case, since combustion is performed in the order of the first cylinder, the third cylinder, the fourth cylinder and the second cylinder, for #1TDC, the immediately preceding combustion cylinder is the second cylinder, and an attenuation learning value is calculated based on the rotation variation amounts $\Delta NL2$ and $\Delta NH2$ of a low-frequency component (b) and a high-frequency component (c) in FIG. 3A with respect to the second cylinder.

In the same way, for #2TDC, an attenuation learning value of the fourth cylinder is calculated. For #3TDC, an attenuation learning value of the first cylinder is calculated. For #4TDC, an attenuation learning value of the third cylinder is calculated.

Specifically, in the case of #1TDC, step S102 outputs YES, and control proceeds to step S106. Step S106 reads the rotation variation amount $\Delta NL2$ of a low-frequency component and the rotation variation amount $\Delta NH2$ of a high-frequency component with respect to the combustion of the second cylinder and calculates the ratio of the ΔNL2 and ΔNH2 (K2=ΔNL2/ΔNH2).

At this time, rotation variation amounts are observed, for example, within 180° CA period before #1TDC, and maximum values of them are defined as ΔNL2 and ΔNH2. Step S107 performs averaging processing (smoothing processing) of K2, for example, by the following expression, and sets the result as an attenuation learning value K2sm of the second cylinder. K2sm=K2sm×15/16+K2/16.

This is also true for other cylinders. For #2TDC, the ratio K4 between the rotation variation amount ΔNL4 of a low-frequency component and the rotation variation amount ΔNH4 of a high-frequency component are calculated with respect to the combustion of the fourth cylinder (step S108). An attenuation learning value K4sm of the fourth cylinder is calculated by averaging processing of K4 (step S109).

For #3TDC, the ratio K1 between the rotation variation amount ΔNL1 of a low-frequency component and the rotation variation amount ΔNH1 of a high-frequency component are calculated with respect to the combustion of the first cylinder (step S110), and an attenuation learning value K1sm of the first cylinder is calculated by averaging processing of K1 (step S111).

Furthermore, for #4TDC, the ratio K3 between the rotation variation amount ΔNL3 of a low-frequency component and the rotation variation amount ΔNH3 of a high-frequency component are calculated with respect to the combustion of the third cylinder (step S112), and an attenuation learning value K3sm of the third cylinder is calculated by averaging processing of K3 (step S113). The attenuation learning values K1sm to K4sm are stored in the backup RAM 54 or the like each time they are calculated.

In the combustion torque calculating processing of FIG. 9, step S201 determines whether engine speed Ne is less than a predetermined threshold value Th3. Th3 is a threshold value for determining whether the engine speed Ne is in a low-frequency or high-frequency range; for example, Th3=3000 rpm.

When Ne<Th3, control proceeds to step S202 to read the rotation variation amount ΔNL of a low-frequency component of the rotation speed signal. Step S203 uses the pre-stored relation of FIG. 6 to calculate a cylinder pressure peak value on the basis of the rotation variation amount ΔNL. In this case, of the cylinder pressure characteristics L1 and L2 shown in FIG. 6, the cylinder pressure characteristic L1 for low rotation is used. This characteristic L1 is cylinder pressure characteristic when Ne=2000 rpm.

Figure 11:
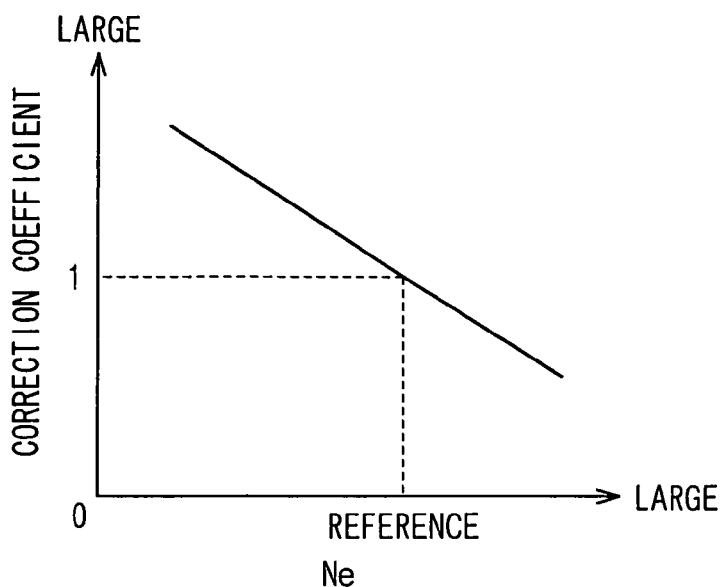
FIG. 11 shows the relation between a rotation sped and a speed correction coefficient.

The rotation variation amount ΔNL is corrected according to the difference between the engine speed Ne and a specified speed (2000 rpm), and the cylinder pressure peak value is calculated by the corrected ΔNL. A speed correction coefficient used to correct ΔNL may be preferably set as shown in FIG. 11, for example. This correction coefficient is one when Ne is equal to the specified speed. This relation is set so that the greater the Ne, the smaller the correction coefficient, and conversely, the smaller the Ne, the greater the correction coefficient. After that, step S207 calculates combustion torque on the basis of the calculated cylinder pressure peak value.

When Ne≧Th3, control proceeds to step S204 to read the rotation variation amount ΔNH of a high-frequency component of the rotation speed signal. step S205 corrects the rotation variation amount ΔNH by using the attenuation learning values calculated in the processing of FIG. 8. ΔNH correction processing is performed as shown in FIG. 10. In FIG. 10, step S301 to S304 determine a cylinder currently in compression TDC.

For a cylinder in TDC, the rotation variation amount ΔNH of the cylinder is corrected. That is, for #1TDC, the rotation variation amount ΔNH2 of the second cylinder is corrected by the attenuation learning value K2sm (step S305). For #2TDC, the rotation variation amount ΔNH4 of the fourth cylinder is corrected by the attenuation learning value K4sm (step S306). For #3TDC, the rotation variation amount ΔNH1 of the first cylinder is corrected by the attenuation learning value K1sm (step S307). For #4TDC, the rotation variation amount ΔNH3 of the third cylinder is corrected by the attenuation learning value K3sm (step S308).

Referring back to FIG. 9, step S206 uses the above relation of FIG. 6 to calculate a cylinder pressure peak value on the basis of the rotation variation amount ΔNH. In this case, of the cylinder pressure characteristics L1 and L2 shown in FIG. 6, the cylinder pressure characteristic L2 for high rotation is used, and the L2 is cylinder pressure characteristic when Ne 4000 rpm.

The rotation variation amount ΔNH is corrected according to the difference between the engine speed Ne and a specified speed (4000 rpm), and the cylinder pressure peak value is calculated by the corrected ΔNH. In this case, like the above step S203, a speed correction coefficient is set using the relation as shown in FIG. 11, and ΔNH is corrected by the correction coefficient. After that, step S207 calculates the combustion torque on the basis of the calculated cylinder pressure peak value.

The above embodiment provides the following advantages.

A low-frequency component (first frequency component) synchronized with combustion cycles of the engine 10 that are contained in the rotation speed signal, and high-frequency component (second frequency component) having a higher frequency than the low-frequency component are used to calculate combustion torque by the rotation variation amount ΔNL of a low-frequency component in a low rotation range, and by the rotation variation amount ΔNH of a high-frequency component in a high rotation range. By this construction, combustion torque can be accurately calculated over the wide range from low rotation to high rotation of the engine 10.

Attenuation characteristic of a high-frequency component of each cylinder is learned as required, and the rotation variation amount ΔNH of the high-frequency component is corrected based on the attenuation learning value. By this construction, variations of the high-frequency component among the cylinders can be eliminated, and the detection accuracy of engine combustion states can be increased. Since the attenuation learning values are calculated in an engine low rotation state in which variations of the low-frequency component among the cylinders are small, attenuation learning values can be learned with high accuracy.

Since the LPF and HPF cutoff frequencies for extracting a low-frequency component and a high-frequency component from the rotation speed signal are set variable with the engine speed Ne, the low-frequency component and the high-frequency component can be extracted correctly even if the engine speed Ne changes. In this case, even if the difference between the low-frequency component and the high-frequency component in an engine high rotation range becomes small, the components can be clearly separated.

The present invention may be embodied as described below without being limited to the above embodiment.

To eliminate variations of the high-frequency component among the cylinders, cylinder-specific attenuation characteristic data of the high-frequency component may be obtained in advance by experiments and stored as map data, and the rotation variation amount $\Delta NH$ of the high-frequency component may be corrected for each cylinder on the basis of the cylinder-specific attenuation characteristic data. In this case, the attenuation characteristic data corresponding to the number of cylinders must be prepared. However, variations of the high-frequency component among the cylinders can be eliminated, and the detection accuracy of engine combustion states can be increased.

Further, in a low rotation region of the engine 10, the rotation speed signal may be used unchangeably to calculate combustion torque. In short, the system may be constructed so that the combustion torque is calculated based on the high-frequency component in a high rotation region to increase the accuracy of calculating combustion torque in the high rotation region.

In addition, a rotation angle sensor of electromagnetic pickup system, or a rotation angle sensor using magnetic resistance elements (MRE) may be used. However, to obtain detailed rotation speed information, it is desirable to construct the system so that a crankshaft angle can be detected with high resolution by minimizing the detection interval of crankshaft angles.

The system may be modified so as to estimate a cylinder pressure peak position of the engine 10 on the basis of the high-frequency component of the rotation speed signal. In short, it is determined from the result of experiments that there is a correlation between the position in which the rotation fluctuation of the high-frequency component of the rotation speed signal is maximum and a cylinder pressure peak position.

Figure 12:
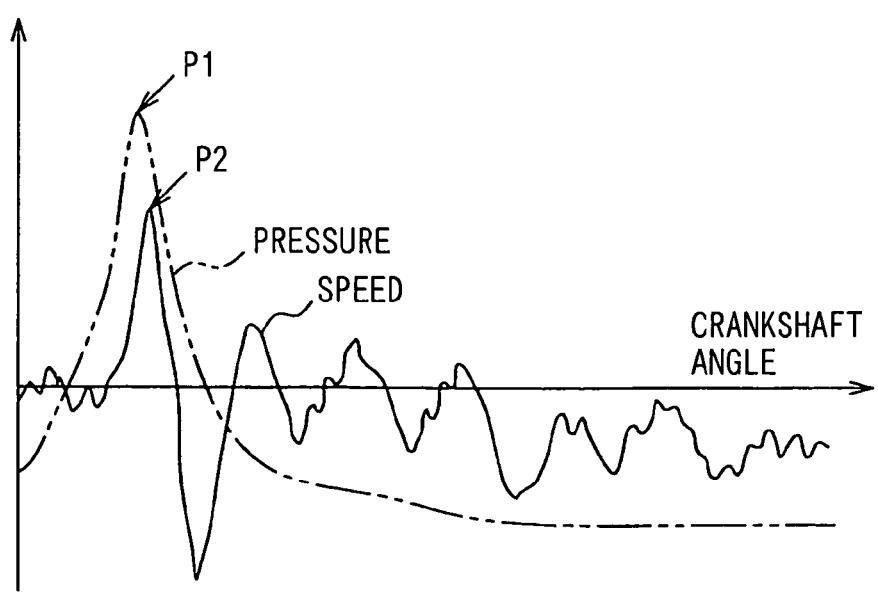
FIG. 12 shows the transition of a cylinder pressure signal and a rotation speed signal.

FIG. 12 shows the transition of a cylinder pressure signal and a rotation speed signal wherein the horizontal axis indicates crankshaft angles. P1 indicates a position (crankshaft angle) of occurrence of peak in the cylinder pressure, and P2 indicates a position of occurrence of peak in the rotation speed signal. Using the result of estimating a pressure cylinder peak position, ignition timing is corrected so that required time from ignition timing to the cylinder pressure peak position becomes a predetermined position after compression TDC. By this operation, ignition timing control can be performed while properly reflecting combustion states.

The system may be modified so as to determine whether the engine 10 knocks on the basis of the high-frequency component of the rotation speed signal. In short, it is determined from the result of experiments that, when a knock occurs, vibration due to the knock is superimposed on the detection signal (rotation speed signal) of the rotation angle sensor 45. This is because the vibration generated by the knock is transferred to the crankshaft through the piston or the like.

The knock vibration is measured by the high-frequency component of the rotation speed signal, and the presence of a knock is determined from the measurement result. In this case, for example, a knock detection technique by a statistical method is applicable. While tentative knock determination is made from knock occurrence probability by statistical processing, tentative knock determination is made based on the waveform of the knock, and the presence of a knock is ultimately determined based on the determinations.

The system may be modified so as to determine the combustion stability or combustion roughness of the engine 10 on the basis of the high-frequency component of the rotation speed signal. In short, since there is a correlation between the rotation variation amount of the high-frequency component and cylinder pressure, combustion stability can be determined on the basis of the rotation variation amount of the high-frequency component.

In this case, rotation variation amounts of the high-frequency component corresponding to a specified sampling population are sampled, statistical processing is performed for the sampled rotation variation amounts, and combustion stability is determined from the result of the statistical processing. To be more specific, only data within a setting area provided in advance for a rotation variation amount for each one combustion is validated, and combustion stability is determined from the standard deviation of rotation variation amounts for the specified sampling population to be validated. As rotation variation parameters, peak value and variation amount of the high-frequency component (amplitude amount), integral value of variation amount, and the like can be used.

In detection of combustion states, the presence of misfire can be detected using the low-frequency component and the high-frequency component of a rotation speed signal. As rotation fluctuation parameters, peak value of the high-frequency component, variation amount (amplitude amount), integral value of the variation amount and the like may be used.

What is claimed is:

1. A combustion state detection device for an internal combustion engine, comprising:
   a rotation speed detection means for producing a rotation speed signal varying with a rotation speed of a crankshaft of an internal combustion engine, the rotation speed signal containing a first frequency component synchronized with combustion cycles of the internal combustion engine and a second frequency component which is higher in frequency than the first frequency component;
   an extracting means for extracting the second frequency component; and
   a state detecting means for detecting a combustion state of the internal combustion engine on the basis of the extracted second frequency component.

2. The combustion state detection device according to claim 1, wherein the state detecting means detects the combustion state on the basis of the second frequency component when a rotation speed of the engine is in a range higher than a predetermined speed.

3. The combustion state detection device according to claim 1, wherein the state detecting means detects the combustion state on the basis of the first frequency component when the rotation speed of the engine is in a range lower than a predetermined speed, and on the basis of the second frequency component when the rotation speed is in a range higher than the predetermined speed.

4. The combustion state detection device according to claim 1, further comprising:
   a correcting means for correcting a rotation variation amount of the second frequency component on the basis of an attenuation characteristic of the second frequency component among cylinders of the engine.

5. The combustion state detection device according to claim 4, further comprising:
   a calculating means for learning, by comparing a rotation variation amount of the first frequency component and a rotation variation amount of the second frequency component calculated for each cylinder, a variation among the cylinders, so that the correcting means corrects the rotation variation amount of the second frequency component by the learned variation.

6. The combustion state detection device according to claim 5, wherein the calculating means calculates the attenuation learning value for each cylinder by the first frequency component and the second frequency component only when the engine is in a specified low rotation state.

7. The combustion state detection device according to claim 4, wherein the correcting means corrects the rotation variation amount of the second frequency component for each cylinder on the basis of pre-stored cylinder-specific attenuation characteristic data of the second frequency component.

8. The combustion state detection device according to claim 1, wherein the extracting means variably sets according to the engine speed an extraction frequency band for extracting the second frequency component from the rotation speed signal.

9. The combustion state detection device according to claim 1, wherein the extracting means variably sets according to the engine speed an extraction frequency band for extracting the first frequency component from the rotation speed signal.

10. The combustion state detection device according to claim 1, wherein the state detecting means includes an estimating means for estimating combustion torque developed during combustion of the engine on the basis of the rotation variation amount of the second frequency component.

11. The combustion state detection device according to claim 1, wherein the state detecting means includes estimating means for estimating a cylinder pressure peak position of the engine on the basis of the second frequency component.

12. The combustion state detection device according to claim 1, wherein the state detecting means includes an estimating means for determining presence of knock occurrence on the basis of the second frequency component.

13. The combustion state detection device according to claim 1, wherein the state detecting means includes an estimating means for sampling rotation fluctuations of the second frequency component plural times, and determining combustion stability of the internal combustion engine on the basis of statistical processing for the sampled rotation fluctuations.

* * * * *